3,157,964
POLYMERIC COMPOSITIONS AND THEIR USE FOR SUPPLYING AND MAINTAINING PLANT MOISTURE
Carl S. Ferguson, Fort Lauderdale, and Roland D. Earle, Hollywood, Fla., assignors to A. E. Staley Manufacturing Company, Decatur, Ill., a corporation of Delaware
No Drawing. Filed Jan. 29, 1962, Ser. No. 169,637
32 Claims. (Cl. 47—1)

This invention relates to a method and composition for supplying moisture to plants as required or maintaining moisture in plants by preventing or retarding its loss by evaporation or otherwise.

It is necessary in the nursery business to transplant numerous trees, bushes and plants which must be kept alive and healthy during the period from the digging to the replanting. The successful dormant storage of live plants (trees, bushes, etc.) depends largely upon proper and uniform moisture application and maintenance in the plant or its root system throughout the storage period, which may extend over a period of up to six months or longer. In dormant storage of plants it is customary to place sphagnum moss, shingle tow, or other packing material about the roots or the entire plant, and to saturate this packing material with water frequently, in order to maintain a suitable condition of humidity. In other instances the required humidity is maintained by automatic sprinkling with water at short intervals, or by frequent watering by manual means. The use of bulky, space-requiring packing materials limits the number of plants which may be stored in a given area. Further, the use of such materials results in shipping parcels that are heavy and bulky. While the use of these bulky materials may be avoided by using the gum-like composition described in Patent Number 2,720,726, the enumerated gum-like materials do have drawbacks. For example, natural gums lack uniformity; they are expensive and susceptible to attack by bacteria, fungi, etc. Because of this lack of uniformity, plant-treating compositions based on natural gums tend to vary from batch to batch in their water absorbing and water retention properties, in the adhesion of the treating composition to the plant, etc. Accordingly, it is relatively difficult to predictably formulate the most effective composition for individual requirements. Further, plant treating compositions based on carboxymethyl cellulose yield brittle films, and the films themselves have relatively poor adhesion to plants, especially during handling, and their water absorption properties while satisfactory for many purposes leave much to be desired. Also, the properties of the natural gums are limited, and do not have the desirable versatility of synthetic materials. Further, the wilting of cut flowers, the drying and consequent splitting of the ends of cut logs, and the destruction of foliage under severe conditions such as cold and hot winds, present kindred moisture retention problems and these cannot be solved using the natural gums.

The principal object of this invention is to provide synthetic resin compositions having uniform, tailor-made water absorbing and water retaining properties, resistance to bacteria, lack of toxicity to plants, economy and versatility of manufacture, compatibility with other ingredients used for treating plants, the resin compositions being advantageous for the dormant storage of plants, for the preservation of cut flowers, for the preservation of foliage, and, in general, wherever moisture loss is a problem. The term "plant" is used in this specification to be inclusive of bushes, flowers, shrubs, foliage, trees, grass, etc.

In one aspect, this invention is a process of treating a plant with an aqueous composition comprising a non-toxic polyhydric alcohol humectant and a salt of an addition polymer of an alpha, beta-ethylenically unsaturated carboxylic acid.

In another aspect, this invention is an aqueous composition having a pH of about 4.5 to 9.5 comprising water, a non-toxic polyhydric alcohol humectant and addition polymer of an alpha, beta-ethylenically unsaturated carboxylic acid or a salt thereof.

In somewhat greater detail, a water-retentive treating composition in accordance with this invention comprises a salt of an addition polymer of an alpha, beta-ethylenically unsaturated carboxylic acid and a polyhydric alcohol humectant, wherein said addition polymer comprises from 5 to 86 weight percent of the combined dry weight of the humectant and addition polymer. The plant treating composition should have the following characteristics: (1) it is non-toxic to plants, (2) an aqueous formulation has a sufficiently high viscosity that it will not run off the nursery stock as applied and yet have sufficient fluidity to permit its application by spraying, (3) its films have a minimum of stickness and adhesiveness, (4) its films are capable of absorbing water applied by flooding (preferably the increase in thickness of the film due to water absorption is evident to the naked eye) and yet resist removal from the plant surface at the same time, and (5) an applied film has a sufficiently low tensile strength that small amounts of film may be removed without danger of removing large areas of the film. The polymeric acid salt gives the plant treating composition sufficient viscosity and adhesion so that a relatively thick layer of water-retaining composition adheres to the plant. On the other hand, the humectant supplements the water retention properties of the polymeric salt, improves the consistency of the treating composition and moderates the stickiness or tack of the polymeric acid salt in such a manner that the treating composition has a sufficient degree of adhesion to cause the composition to adhere as a layer of substantial thickness to the plant surface and yet not adhere to another treated plant surface. Prior to use, the polymeric acid or salt thereof can be compounded with materials necessary or useful for plant growth or preservation, such as plant food, a source of oxygen, hormone substance, insecticides, fungicides, etc.

The coating and plant form a structure wherein the coating acts as a water reservoir from which the plant is able to draw water. A somewhat more detailed discussion of the water reservoir coatings and their dependence on the cation portion of the polymeric material is set forth below. Accordingly, the plant has a much longer storage life. Further, the plant suitably coated can be transported without packing the plant in peat or other material.

THE POLYMERIC CONSTITUENT

The polymeric constituent of this invention is an addition polymer of an alpha, beta-ethylenically unsaturated carboxylic acid, whose salts are viscous at low total solids concentration. Preferably, a 5% by weight aqueous solution of the polymeric acid salt should be a thick gel, which, when dried, does not show tackiness if rubbed between the fingers. The gel should be different from that formed from gelatin in that it is soft and capable of being cut, as with a spatula, and, when cut, it flows together behind the cutting instrument.

While it is desirable that the polymeric acid salt be very viscous at low total solids in order to give the final composition the proper consistency for treating the plants, it is also desirable that the polymeric acid be capable of transportation at a high total solids concentration. Accordingly, since many of the homopolymeric alpha, beta-ethylenically unsaturated carboxylic acids (polyacrylic acid, for example) are extremely viscous at total solids concentrations as low as five or ten percent, it is economically preferable to employ addition copolymers of the unsaturated carboxylic acid with a second ethylenically unsaturated monomer, which can be transported at a much higher total solids concentartion. Therefore, while the alpha, beta-ethylenically unsaturated carboxylic acid can comprise from 5 to 100 mole percent of the polymerizable monomers, I prefer to employ copolymerizates wherein the acid monomer comprises from 10 to 50 mole percent of the polymerizable monomers. The preferred copolymers can be shipped at total solids concentrations as high as 60% by weight or even higher and, on dilution and neutralization with an alkali, they form viscous compositions at total solids of from about 5 to 10% by weight. These addition polymers offer the advantage that they can be shipped in mildy acid, non-viscous, high solids form and for compounding, are diluted and made alkaline to yield the viscous, adherent, film-forming composition.

Acrylic acid, methacrylic acid, ethacrylic acid, maleic acid, maleic anhydride, alkyl hydrogen maleates such as butyl hydrogen maleate and octyl hydrogen maleate, fumaric acid, alkyl hydrogen fumarates such as butyl hydrogen fumarate and octyl hydrogen fumarate, itaconic acid, alkyl hydrogen itaconates such as butyl hydrogen itaconate and octyl hydrogen itaconate, cinnamic acid, crotonic acid, etc. are representatives of the various alpha, beta-ethylenically unsaturated carboxylic acids, which can be employed in the addition polymers of this invention.

The above acid monomers can be and preferably are copolymerized with one or more ethylenically unsaturated monomers such as styrene, vinyl toluene, ethylene, propylene, isobutylene, butadiene, vinyl acetate, vinyl chloride, vinylidene chloride, acrylamide, acrylonitrile, methyl acrylate, ethyl acrylate, Cellosolve acrylate, methyl methacrylate, vinyl methyl ether, vinyl ethyl ether, divinyl benzene, diallyl phthalate, ethylene glycol dimethacrylate, etc. Generally, cross-linking agents, such as divinyl benzene and ethylene glycol dimethacrylate, are only employed in minor amounts to supplement the non-acidic monomer.

The polymeric acids of this invention are prepared by the direct polymerization of a monomeric alpha, beta-ethylenically unsaturated carboxylic acid in contrast to the hydrolysis of preformed polymers of acrylate esters, of acrylonitriles, of acrylamides, etc., the resulting products of which are the subject of copending application, Serial No. 169,638, filed on even date. The polymeric acids prepared by polymerization of an alpha, beta-ethylenically unsaturated carboxylic acid have several advantages over the hydrolysis products: (1) processing advantages, (2) lower transportation cost and (3) easier to formulate with the other components of the plant treating composition. For example, a partially hydrolyzed polyacrylate ester having about 30% of its monomeric units hydrolyzed is prepared by alkaline hydrolysis, followed by precipitation with strong mineral acid. The resultant product is then laboriously washed with dilute acid until a relatively pure curd-like material is isolated. The curd-like hydrolysis product at this point is water-insoluble and must be dissolved in base before it is compounded. If the curd-like product is shipped prior to dissolution in alkali, the curd is prone to setting up into an infusible mass, which must be chipped out of the container. On the other hand, the alkaline form can be shipped at a maximum concentration of 6 to 7%. At this concentration, the partially hydrolyzed polymer is so viscous that it is not pourable and must be dug out of the container. In contrast to this, polymeric acids of this invention prepared in the acid form by the emulsion polymerization of an alpha, beta-ethylenically unsaturated acid can be prepared in a readily compoundable state at total solids concentration of up to 60% or more by weight.

On neutralization, the addition polymers have essentially the same high viscosity at low total solids as the hydrolysis products. Of course, the direct polymerization of the alpha, beta-ethylenically unsaturated carboxylic acid is more straight-forward, less time-consuming and less troublesome than the hydrolysis route: Further, the purification technique required by the hydrolysis product makes it much less attractive to carry out the polymerization in the presence of a humectant, since most of the humectant is lost during the purification of the hydrolyzed polymer. In practice, the humectant must be added to the hydrolyzed polymer after dissolution in alkali and dilution in water.

While the addition copolymers of this invention are preferably prepared by free radical emulsion polymerization of an alpha, beta-ethylenically unsaturated carboxylic acid at an acidic pH, the polymers can be produced by a variety of methods, all of them less advantageous than the preferred method. For example, salts (sodium, potassium, ammonium, etc.) of the alpha, beta-ethylenically unsaturated carboxylic acids may be polymerized in place of the acids at an alkaline pH. One may also form polymers by bulk polymerization, solution polymerization, suspension polymerization, etc. Although these alternative techniques offer some of the flexibility and processing advantages of the preferred emulsion route over the hydrolysis technique, they also produce addition polymers that must be transported at lower concentrations than comparable emulsion polymers or that have reduced humectant compatibility, compatibility with water and other desirable ingredients or that are more difficult to formulate than the emulsion polymers. Even the emulsion polymers have some of these formulation drawbacks if the emulsion polymer is spray dried.

THE HUMECTANT

As pointed out above, the salts of the addition polymers of this invention are used with a non-toxic polyhydric alcohol humectant in order to enhance the water-retaining properties of the polymer and thus to lower the polymer's already low rate of moisture loss. The humectant makes it possible to regulate the rate at which water is supplied to a coated plant. The non-toxic polyhydric alcohol humectants also have the properties of advantageously modifying the adhesive properties of the polymeric acid salt to plant material, of plasticizing the film of polymeric salt and of improving the consistency of the plant treating composition. These materials also have a lubricating effect on the plants, which imparts a softness and flexibility to the plant surface even after much of the moisture in the composition has been lost by evaporation. Accordingly, the complete drying of the plant does not take place even after prolonged storage. The humectant can be added to the polymeric acid or conversely the polymeric acid can be added to the humectant either before or after neutralization of the polymeric acid. Further, all or part of the humectant can be added to the polymerizable monomers and the polymerization carried out in its presence.

The non-toxic polyhydric alcohol humectants have sufficient hydroxyl groups to be reasonably water soluble. Further, they are capable of absorbing water from the atmosphere, but are not sufficiently hygroscopic to dehydrate plant tissue; they are also capable of retaining water over a wide range of humidity fluctuation. One or more of the following polyhydric humectants can be used advantageously in this invention: Propylene glycol, hexylene glycol, solid polyoxyethylene glycols having molecular weights in excess of about 1,000, liquid polyethylene glycols having a molecular weight less than about 1,000, hydroxyethyl starch, alkaline hypochlorite oxidized starch, carboxyethyl starch, sodium carboxymethyl cellulose, polymethylene glycols, etc. Treating compositions containing mono and disaccharides, such as dextrose and maltose, are less desirable because the coatings formed from such compositions tend to adhere to the coatings of other plants. Glycerol should be used with caution since under some conditions it may be detrimental to plants due to its dehydrating action on growing plants.

NEUTRALIZED COMPOSITION

While virtually any water-soluble, alkaline material can be used to neutralize the polymeric acid, the choice of alkali depends upon the ultimate application and type of plant coating desired. Ammonium hydroxide and the alkali metals, such as potassium hydroxide and sodium hydroxide, are the preferred sources of alkali. If a continuous film, which functions primarily as a barrier against loss of water (type I composition), is desired, a volatile alkali such as ammonium hydroxide, is used as the neutralizing agent for the polymeric acid composition. After application to the plant, the ammonia is evolved from the coating layer as it dries prior to evolution of a significant amount of water. Since ammonia evaporates first from the exposed surface of the film, the evaporation seals the surface of the coating so that subsequent loss of moisture from the plant surface (and the film) is minimized. Generally, ammonium hydroxide neutralized compositions are used for treating cut flowers, cut log ends, evergreens, etc. For example, the copolymer of ethyl acrylate and methacrylic acid may be combined, either before or after polymerization with hexylene glycol and the mixture neutralized with ammonium hydroxide. This composition, when properly diluted and applied by dipping or spraying and then allowed to dry forms a clear, water-resistant, continuous elastic film which suppresses loss of moisture from cut flowers, such as lily heads, for periods several times longer than heretofore commercially possible. Furthermore, as is apparent, the clarity and gloss of the film enhances the natural beauty of the flowers. A similar composition may be applied to foliage of plants, such as evergreens, to retard evaporation from the leaves and subsequent possible injury, induced by cold or hot winds, etc. Again, the film enhances the appearances of the plant. Another important application of such compositions is in connection with the foliar feeding of deciduous shade trees, particularly those situated where root feeding is impractical, as for example, trees bordered by streets or pavements. The polymeric composition in this case serves as a carrier for plant nutrients in solution as well as for compatible fungicides and insecticides. The carrier film extends the effective life of the plant food, etc., since it is not readily removed by rain. On the contrary, such a film absorbs water from rain without being washed off readily, thereby providing water and nutrients in solution over a longer period than would be possible by spraying with aqueous solutions of the nutrients.

The ammonium salt of a copolymer of a dibasic acid, such as fumaric acid or maleic anhydride, with a second ethylenically unsaturated monomer also possesses additional desirable properties. For example, a copolymer of ethylene and maleic anhydride deposited from aqueous ammonia solution possesses unusually high water absorption and when compounded with a polyoxyethylene glycol, it is advantageously used for treating the stems of plants. The alkyl half-esters of such dibasic acid addition polymers are also of considerable value. For example, a copolymer of butyl hydrogen itaconate, methyl methacrylate and ethyl acrylate has been determined to be effective in preventing the dehydration of the canes of packaged dormant roses. The rose canes are first dipped in a dilute ammonical solution of the copolymers and, while still wet, are dipped into a dilute solution of ammonium zirconyl carbonate. The second dip causes instantaneous drying and curing of the copolymer film to such an extent that it can be handled readily even with less than ordinary care. On further drying in ambient air a clear, plastic, moisture-barrier results which substantially prevents dehydration of the canes, and yet permits normal growth after transplanting. This material is of special value for packaged roses which may be kept on open display for sales purposes for long periods of time, and this technique preserves the roses longer than the application of only an ammonical solution of polymer. The monoalkyl itaconates are unique in not requiring the presence of any humectant.

In the above uses where a continuous water barrier-type film is desired, the addition polymer preferably comprises from about 30 to 86 weight percent of the combined dry weight of polymers and humectants. While these compositions can be applied to any part of a plant (dormant, growing or cut), it is preferable that compositions having these relatively small proportions of humectant not be used to treat the bare roots of dormant plants.

Compositions based on polymeric acids neutralized with non-volatile alkali, particularly sodium or potassium hydroxide, function in a somewhat different manner from compositions based on polymeric acids neutralized with volatile alkali. On plants, the films of the latter (type I compositions) serve primarily as barriers against the loss of moisture and secondarily as moisture reservoirs, but the moisture content of the films is not as easily reversible because the exposed surface is relatively impervious. On the other hand, the former compositions (type II, using non-volatile alkali) form swellable coatings on the plant which readily absorb externally applied moisture, thereby acting primarily as a moisture reservoir and secondarily as a barrier against moisture loss. Type II compositions retain their water-absorptive surfaces. The compositions based on polymeric acids neutralized with non-volatile alkali, are most efficacious in the treatment of the roots of dormant plants. Roots are preferentially treated with the potassium salt of the polymeric acid, since potassium is recognized as a major plant food and there is less possibility of toxicity to the plant than from the sodium salt. Generally, in this use the polymeric material comprises from 5 to 35% of the combined dry weight of the polymeric material and humectant.

Although compositions based on polymeric acids neutralized with volatile alkali can be expected to form barrier type I films, the addition of optional ingredients, which contain ionizable salts such as sodium and potassium, can convert the plant treating composition to swellable type II compositions or a balance of properties may be obtained. For example, a plant treating composition based on the ammonium salt of a methacrylic acid-ethyl acrylate copolymer, which has been compounded with the sodium salt of dithiocarbamic acid (a fungicide sold as Vancide 51), forms a swellable type II composition which is suitable for the treatment of dormant roots.

OPTIONAL ADDITIVES

As pointed out above the properties of the plant coatings can be advantageously augmented by after-treatments with polyvalent metal compounds, such as ammonium zirconyl carbonate. Increased water resistance of the coating by cross-linking of the carboxyl groups of the polymer with polyvalent metal ions may also be attained by incorporating the metal ions into the plant treating composition itself. In this case, the metal ion must remain in solution or in an inactive state until the composition has been applied to the plant. One very convenient method of keeping the metal ion inactive is to use an ammonium complex, such as a zinc or zirconium ammonium complex. Another method is by incorporating a volatile solvent, such as an alcohol, for any possible reaction product of the metal ion and polymeric acid. The cross-linking effect or insolubilization takes place as the metal complexing agent or solvent for the cross-linked polymer evaporates from the surface of the coating. The excess aqueous ammonia used in complexing the metal is, for the purpose of this description, included in the term "solvent."

Desirable properties may also be conferred on the plant treating composition by the incorporation of one or more metal chelates, such as zinc, iron, copper or manganese chelate of a sugar acid, such as gluconic acid or glucoheptonic acid. For example, a dilute ammonium hydroxide solution of a copolymer of ethyl acrylate and methacrylic acid, which has been polymerized in the presence of hexylene glycol, forms, in the presence of a soluble zinc salt, such as a zinc glucoheptonate, a film that absorbs water more readily and retains the absorbed water longer, than like films without the zinc chelate. Chelates are also valuable for supplying trace minerals to the plants, such as manganese, zinc and iron.

If the composition as made up for application to plants is found to be difficult to spread over the plant surface, such as over fine root hair, so as to cover them completely, a wetting agent may be added to promote such spreading. Any non-toxic wetting agent, such as dioctyl sodium sulfosuccinate, can be used for this purpose.

In the dormant storage of plants, the plant roots should be supplied with small amounts of oxygen. This may be accomplished by whipping air into the root treating composition. A more effective way is to include a peroxide such as hydrogen peroxide, magnesium peroxide, calcium peroxide, etc., in the composition. In the composition of this invention these decompose at a relatively low rate providing oxygen over a long period of time.

In addition to the foregoing, I prefer to include, in compositions for treating growing and dormant plants, plant nutrients in the form of balanced plant foods or fertilizer supplying required nitrogen, phosphorous and potassium and growth stimulating hormones such as naphthyl acetamide or the methylester of naphthyl acetic acid. The commercially available hormone substance, which contains only about 0.02% to 0.04% active material, can be used alone or mixed with Vitamin $B_1$. Balanced water-soluble fertilizers are readily available. A good balanced fertilizer for root application contains about 7% nitrogen, 6% phosphoric acid, and 19% potash. Part or all of the potassium can be furnished as the non-volatile alkali used in neutralizing the polymer. The nutrients can include or consist of a suitable salt or salts, such as monocalcium phosphate, monobasic ammonium phosphate, monobasic potassium phosphate, dibasic ammonium sulfate, etc. The acid salts also can be used to adjust the pH of the treating composition to an acidic pH. For example, forest seedlings are preferably treated with a composition having a pH below about 5.5. Generally, the plant treating composition has a pH of from about 4.5 to 9.5.

If an extended period of time for shipping or storage is expected, and especially if the plants are to be shipped or stored at a warm temperature, one or more preservatives should be included in the composition to inhibit attack on the plants by bacteria, fungi, insects, etc. (The polymeric material of this invention is inherently resistant to such damage.) The same preservatives are also advantageous for treating the foliage of growing plants. Some of the humectants, such as propylene glycol, and the various peroxides have some preservative activity. Various other materials such as formalin, sodium propionate, sodium dithiocarbamate, sorbic acid, etc., which have specific activities may also be included.

For the purposes of this invention all of the above optional materials may be thought of as being "plant beneficents."

APPLICATION OF THE PLANT TREATING COMPOSITION

The various ingredients of the plant treating composition are formulated with water at a total solids concentration of about 0.1% to 25%. The most desirable concentration varies with the particular use and mode of application. For example, a type I composition is advantageously applied to ends of cut logs and to rose canes at a total solids concentration of about 10% to 20% or to the ball of earth surrounding the roots of a tree in transit at a concentration as low as 0.1%. Bare roots are advantageously treated with a type II composition at a concentration of about 2% to 15%.

The resulting treating composition can then be applied to the plant by dipping the plant, by spraying, by brushing, etc. In general the treating composition is sufficiently viscous so that it does not run off the nursery stock as applied but instead forms a substantial layer. This substantial layer (film) (1) has a minimum of stickiness and tackiness, (2) is capable of supplying the plant with necessary moisture over an extended period of time, (3) is capable of absorbing more water by flooding as the water in the layer is depleted (preferably the increase in thickness of the film due to water absorption is visible to the naked eye) while at the same time resisting removal from the plant surface, and (4) has a sufficiently low tensile strength that small amounts of film can be removed without danger of removing large amounts of the film.

The plant-treating composition can be packaged in aerosol containers for convenient home use. In this case, the humectant and polymeric acid salt are compounded with a solvent which is miscible with water and compatible with (not reactive with) the propellant. For example, it has been found that solvents, such as ethanol, propanol, and isopropanol, can be used with dilute ammonium hydroxide solutions of humectant and polymeric acid in conjunction with the conventional Freon propellants, such as trichlorofluoromethane (Freon–11) and dichlorodifluoromethane (Freon–12). Other propellants, such as nitrogen and nitrous oxide may also be employed. Any optional ingredients used in an aerosol formulation should be compatible with the miscible solvent. The miscible solvent and propellant may also be thought of as "plant beneficents."

The following examples are merely illustrative and should not be construed as limiting the scope of the invention.

Example 1

A plant treating composition was formulated by diluting 52.8 pounds (35 percent by weight total solids) of an aqueous emulsion copolymer of 80 parts ethyl acrylate (77.4 mole percent) and 20 parts methacrylic acid (22.6 mole percent) to 131.4 pounds with water. Seven and four-tenths pounds of hexylene glycol was dissolved in 24.5 pounds of water and then slowly stirred into the polymeric emulsion. Four pounds of 26 Baumé ammonium hydroxide was diluted with 23 pounds of water and then slowly stirred into the polymeric emulsion. Another 50.4 pounds of water was stirred into the emulsion and the stirring was continued until the composition was transparent.

Prior to winter, a number of evergreens were sprayed with the above composition. At the end of the winter, many of the untreated evergreens in the area had brown areas due to winter kill, whereas none of the treated evergreens had any noticeable brown areas. Likewise, cut lilies which had been dipped into the above composition kept their fresh appearance while untreated lilies wilted rapidly.

Essentially the same results are obtained by varying the above components in the following manner:

| | |
|---|---|
| Ethyl acrylate methyacrylic acid copolymer | 40–60 pound (dry basis). |
| Hexylene glycol | 10–40 pounds. |
| 26 Baumé ammonium hydroxide | 5–15 pounds. |
| Water | 400–800 pounds. |

Likewise, essentially the same results can be obtained by replacing the ethyl acrylate-methyacrylic acid copolymer with either an emulsion copolymer of methyl acrylate (60 mole percent) and methacrylic acid (40 mole percent) or an emulsion copolymer of methyl acrylate (75 mole percent) and acrylic acid (25 mole percent).

*Example 2*

A plant treating composition particularly suited for use in aerosol sprays was prepared by essentially the method of Example 1 having the following composition:

| | |
|---|---|
| Ethyl acrylate-methacrylic acid copolymer of Example 1 | 36 pounds (dry basis). |
| Hexylene glycol | 18 pounds. |
| 26 Baumé ammonium hydroxide | 8 pounds. |
| Water | 414 pounds. |
| Isopropanol | 1,080 pounds. |

The above composition was compounded with 400 pounds of a 50/50 mixture of Freon–11 and Freon–12 in a pressurized dispenser.

*Example 3*

A composition suitable for treating the bare roots of dormant plants was formulated by diluting 100 pounds (10 percent by weight total solids) of an aqueous emulsion copolymer of 80 parts Cellosolve acrylate (70 mole percent) and a 20 parts methacrylic acid (30 mole percent) which had been copolymerized in the presence of a mixture of 50 parts polyoxyethylene glycols (25 parts Carbowax 1500 and 25 parts Carbowax 600) and 50 parts of pasted alkaline hypochlorite-oxidized starch to between 6 and 7 percent total solids with 50 pounds water. This polymeric composition was stirred into an aqueous, alkaline polyoxyethylene solution which had been prepared by adding 100 pounds of water and 25 pounds of a 2 percent by weight aqueous potassium hydroxide solution to 40 pounds of polyoxyethlene glycols (20 pounds Carbowax 1500 and 20 pounds Carbowax 600). Fifteen pounds of a balanced fertilizer (3 pounds dry basis), 1¾ pounds of Vancide 51 (0.5 pound dry basis) and 0.05 pound of 30 percent aqueous hydrogen peroxide were stirred into the polymeric composition. The resulting composition was diluted with sufficient water to make up 50 gallons and was suitable for application to the bare roots and stems of rose bushes, etc.

The above composition can be varied in the following manner:

| | |
|---|---|
| Emulsion copolymer of 80 parts Cellosolve acrylate and 20 parts methacrylic acid polymerized in the presence of up to 50 parts polyethylene glycol and up to 100 parts oxidized starch | 10–20 pound (dry basis). |
| Polyethylene glycol | 10–40 pounds. |
| Potassium hydroxide (2 percent solution) | 25–50 pounds. |
| Balanced fertilizer | 1–3 pounds dry basis). |
| Fungicide (Vancide 51) | 0.5 to 2.0 pound (dry basis). |
| Water to make | 50 gallons. |

Other suitable emulsion copolymers are obtained by replacing Cellosolve acrylate with methyl acrylate, ethyl acrylate, etc. and/or replacing methacrylic acid with acrylic acid.

*Example 4*

A composition suitable for treating the bare roots of dormant plants was formulated in the manner described in Example 3, comprising 6 pounds (dry basis) of an emulsion copolymer of 80 parts methyl acrylate and 20 parts methacrylic acid polymerized in the presence of 50 parts starch; 30 pounds polyethylene glycol; 25 pounds of a 2 percent solution of potassium hydoxide; 2 pounds (dry basis) balanced fertilizer; 0.5 pounds (dry basis) fungicide; and sufficient water to make 50 gallons.

The above formulation can be varied in the following manner:

| | |
|---|---|
| Emulsion copolymer of 80 parts methyl acrylate and 20 parts methacrylic acid polymerized in the presence of from 2 to 50 parts starch, starch derivative, or modified starch | 6–15 pounds (dry basis). |
| Polyethylene glycols | 30–60 pounds. |
| 2 percent solution of potassium hydroxide | 25–50 pounds. |
| Balanced fertilizer | 2–4 pounds (dry basis). |
| Fungicide (Vancide 51) | 0.5 to 2.0 pounds (dry basis). |
| Water to make | 50 gallons. |

*Example 5*

A composition suitable for treating the bare roots of dormant plants was formulated in the manner described in Example 3, comprising 10 pounds (dry basis) of an emulsion copolymer of 80 parts Cellosolve acrylate and 20 parts methacrylic acid polymerized in the presence of 50 parts polyethylene glycol and 50 parts hydroxyethyl starch; 40 pounds polyethylene glycol; 25 pounds of a 2 percent solution of potassium hydroxide; 1 pound (dry basis) balanced fertilizer; 0.5 pound (dry basis) fungicide; 0.05 pound of a 30 percent solution of hydrogen peroxide; and sufficient water to make 50 gallons.

The above ingredients can be varied in the following manner:

| | |
|---|---|
| Emulsion copolymer of 80 parts Cellosolve acrylate and 20 parts methacrylic acid polymerized in the presence of 50 parts polyethylene glycol and 50 parts hydroxyethyl starch | 10–20 pounds (dry basis). |
| Polyethylene glycols | 40–60 pounds. |
| 2 percent solution of potassium hydroxide | 25–50 pounds. |
| Balanced fertilizer | 1–3 pounds (dry basis). |
| Fungicide (Vancide 51) | 0.5 to 2.0 pounds (dry basis). |
| 30 percent solution of hydrogen peroxide | 0.05 pound. |
| Water to make | 50 gallons. |

*Example 6*

A composition suitable for treating lawns was formulated in the manner described in Example 3, comprising 10 pounds (dry basis) of an emulsion copolymer of 80 parts ethyl acrylate and 20 parts methacrylic acid polymerized in the presence of 50 parts hexylene glycol and 50 parts oxidized starch; 25 pounds of a 2 percent potassium hydroxide solution; 2 pounds (dry basis) of a balanced fertilizer; 0.5 pound (dry basis) of a fungicide; 0.1 pound of magnesium peroxide; and sufficient water to make 50 gallons.

The above composition can be varied in the following manner:

| | |
|---|---|
| Emulsion copolymer of 80 parts ethyl acrylate and 20 parts methacrylic acid polymerized in the presence of 50 parts hexylene glycol and from 50–100 parts oxidized starch | 10–20 pounds (dry basis). |
| 2 percent solution of potassium hydroxide | 25–50 pounds. |
| Balanced fertilizer | 2–6 pounds (dry basis). |
| Fungicide (Vancide 51) | 0.5–2 pounds (dry basis). |
| Magnesium peroxide | 0.1 to 1 pound. |
| Water to make | 50 gallons. |

The hexylene glycol in the above copolymer may be replaced by 50 parts of polyethylene glycols (25 parts of Carbowax 600 and 25 parts of Carbowax 1500 for example). Likewise, the potassium hydroxide solution may be replaced by 10 to 20 pounds of a 26 Baumé ammonium hydroxide solution.

*Example 7*

A composition suitable for treating the bare roots of dormant plants are formulated in the manner described in Example 3, comprising 3 pounds (dry basis) of a copolymer of ethylene and maleic anhydride; 40 pounds polyethylene glycols; 1 pound (dry basis) balanced fertilizer; 0.5 pound (dry basis) fungicide; 0.1 pound magnesium peroxide; 1 pound of a 26 Baumé ammonium hydroxide solution; and sufficient water to make 50 gallons.

The above composition may be varied in the follow manner:

| | |
|---|---|
| Copolymer of ethylene and maleic anhydride | 3–6 pounds (dry basis). |
| Polyethylene glycols | 10–60 pounds. |
| Balanced fertilizer | 1–3 pounds (dry basis). |
| Fungicide (Vancide 51) | 0.5–2 pounds (dry basis) |
| Magnesium peroxide | 0.1–1.0 pound. |
| 26 Baumé ammonium hydroxide solution | 1–2 pounds. |
| Water to make | 50 gallons. |

*Example 8*

A composition suitable for treating the bare roots of dormant plants was formulated in the manner described in Example 3, comprising 1 pound of a copolymer of ethylene and maleic anhydride; 5 pounds (dry basis) of the polymer of Example 3; 40 pounds polyethylene glycols; 1 pound (dry basis) balanced fertilizer; 0.5 pound (dry basis) fungicide (Vancide 51); and water to make 50 gallons.

The above composition may be varied in the following manner:

| | |
|---|---|
| Ethylene-maleic anhydride copolymer | 1–3 pounds (dry basis). |
| Polymer of Example 3 | 5–10 pounds (dry basis). |
| Polyethylene glycols | 10–60 pounds. |
| Balanced fertilizer | 1–3 pounds (dry basis). |
| Fungicide (Vancide 51) | 0.5–2.0 pounds (dry basis). |
| 30 percent aqueous solution of hydrogen peroxide | 0–0.05 pound. |
| 2 percent solution of potassium hydroxide | 20–50 pounds. |
| Water to make | 50 gallons. |

*Example 9*

A plant treating composition suited for use in aerosol sprays was prepared by essentially the method of Example 1, comprising 20 pounds (dry basis) of an emulsion copolymer of 82 parts ethyl acrylate (89.4 mole percent) and 18 parts of butyl acid itaconate (10.60 percent); 10 pounds hexylene glycol; 6 pounds of a 26 Baumé ammonium hydroxide solution; 200 pounds of water; and 200 pounds of isopropanol. This composition was compounded with 200 pounds of propellant mixture of Freon-11 and Freon-12 in a pressurized dispenser.

The above composition is particularly suited for application to evergreens, stems of rose bushes, etc.

The butyl acid itaconate can be replaced by octyl acid itaconate or cetyl acid itaconate, etc. The ethyl acrylate may be replaced by methyl acrylate, methyl methacrylate, etc., or mixtures of acrylates and methacrylates.

The above composition may be varied in the following manner:

| | |
|---|---|
| Emulsion copolymer of monobutyl itaconic acid and ethyl acrylate | 20–40 pounds (dry basis). |
| Hexylene glycol | 10–30 pounds. |
| 26 Baumé ammonium hydroxide solution | 6–10 pounds. |
| Water to make | 200–300 pounds. |
| Isopropanol | 200–600 pounds. |
| Propellant | From 25% to 40% by weight of the total plant treating composition. |

*Example 10*

This example illustrates a plant treating composition requiring no humectant. One hundred pounds (36 percent by weight total solids) of an aqueous emulsion copolymer of 18 parts butyl acid itaconate (10.60 mole percent), 62 parts ethyl acrylate (67.60 mole percent), and 20 parts methyl methacrylate (21.8 mole percent) and 3 pounds of a 26 Baumé ammonium hydroxide solution were diluted with water to 100 pounds.

Several rose bushes were dipped in the above treating composition and then dipped in a solution of ammonium zirconyl carbonate with care being taken not to allow the roots of the rose bushes to come in contact with the above solution. The roots of the rose bushes were then dipped in the composition of Example 3.

The above composition may be varied in the following manner:

| | |
|---|---|
| Emulsion copolymer of ethyl acrylate, methyl methacrylate and butyl acid itaconate | 15–25 pounds (dry basis). |
| 26 Baumé ammonium hydroxide solution | 3–5 pounds. |
| Water to make | 100 pounds. |

As in the preceding example, the butyl acid itaconate may be replaced by methyl acid itaconate, cetyl acid itaconate, octyl acid itaconate, stearyl acid itaconate, etc. Likewise, the ethyl acrylate may be replaced by methyl acrylate and part or all of the methyl methacrylate may be omitted.

*Example 11*

Over 60 trees, both deciduous and evergreen types, were transplanted in full leaf during July, without apparent injury or set back after the application of the composition of Example 1 to their leaves and a composition of the type described in Example 4 to their roots. Included among these trees were 30 to 40 foot high Douglas Firs.

Since many embodiments of this invention may be made and since many changes may be made in the embodiments described, the foregoing is to be interpreted as illustrative only and our invention is defined by the claims appended hereafter.

We claim:

1. The method of supplying and maintaining plant moisture, which comprises coating at least part of a plant with a nontoxic, aqueous composition comprising water, a polyhydric alcohol humectant and a salt of an addition polymer of an alpha, beta-ethylenically unsaturated carboxylic acid, wherein said alpha, beta-ethylenically unsaturated carboxylic acid comprises from about 5 to 100 mole percent of the monomeric units in said addition polymer and wherein said addition polymer comprises from about 5 to 86 weight percent of the combined dry weight of humectant and addition polymer.

2. The method of claim 1, wherein the cation of said salt is selected from the group consisting of ammonium, sodium and potassium.

3. The method of claim 1, wherein said alpha, beta-ethylenically unsaturated carboxylic acid comprises from about 10 to 50 mole percent of the monomeric units in said addition polymer and is an acid selected from the group consisting of acrylic acid, methacrylic acid, maleic anhydride, a monoalkyl acid itaconate, a monoalkyl acid fumarate and a monoalkyl acid maleate.

4. The method of claim 3, wherein at least part of said humectant is hexylene glycol.

5. The method of claim 3, wherein at least part of said humectant is a polyoxyethylene glycol.

6. The method of claim 1, wherein said composition contains a member selected from the group consisting of a dissolved polyvalent metal compound, a fungicide, a source of oxygen, a preservative, a plant nutrient, a plant hormone and mixtures thereof.

7. The method of supplying and maintaining plant moisture, which comprises coating at least part of a plant with a nontoxic, aqueous composition comprising water, a polyhydric alcohol humectant and an ammonium salt of an addition polymer of an alpha, beta-ethylenically unsaturated carboxylic acid, wherein said addition polymer comprises from about 30 to 86 weight percent of the combined dry weight of humectant and addition polymer, and said alpha, beta-ethylenically unsaturated carboxylic acid comprises about 5 to 100 mole percent of the monomeric units in said addition polymer.

8. The method of claim 7, wherein the resulting coated plant is after treated with a dissolved polyvalent metal compound to crosslink said polymer.

9. The method of claim 7, wherein said addition polymer is a copolymer of an alkyl acrylate and methacrylic acid.

10. The method of claim 7, wherein said addition polymer is a copolymer of an alkyl acrylate and acrylic acid.

11. The method of supplying and maintaining plant moisture, which comprises coating at least part of a plant with a non-toxic, aqueous composition comprising water, a polyhyric alcoholic humectant, and an alkali metal salt of an addition polymer of an alpha, beta-ethylenically unsaturated carboxylic acid, wherein said addition polymer comprises from about 5 to 35 weight percent of the combined dry weight of humectant and addition polymer, and said alpha, beta-ethylentically unsaturated carboxylic acid comprises from about 5 to 100 mole percent of the monomeric unit in said addition polymer.

12. A non-toxic, water-retentive, composition for coating plants having a pH of about 4.5 to 9.5 comprising water, a plant beneficent, a polyhydric alcohol humectant, and a salt of an addition polymer of an alpha, beta-ethylenically unsaturated carboxylic acid, wherein said polymer comprises from about 5 to 86 weight percent of the combined dry weight of humectant and addition polymer, and said alpha, beta-ethylenically unsaturated carboxylic acid comprises from about 5 to 100 mole percent of the monomeric units in said addition polymer.

13. The composition of claim 12, wherein the cation of said salt is selected from the group consisting of ammonium, sodium and potassium.

14. The composition of claim 12, wherein said alpha, beta-ethylenically unsaturated carboxylic acid comprises from 10 to 50 mole percent of the monomeric units in said addition polymer and is an acid selected from the group consisting of acrylic acid, methacrylic acid, maleic anhydride, a monoalkyl acid itaconate, a monoalkyl acid fumarate and a monoalkyl acid maleate.

15. The composition of claim 12, wherein said plant beneficient is a member selected from the group consisting of a dissolved polyvalent metal compound, a fungicide, a source of oxygen, a preservative, a plant nutrient, a plant hormone and mixtures thereof.

16. The composition of claim 12, wherein said composition contains a propellant, water and a water-miscible solvent and is packaged in a pressurized dispenser.

17. The composition of claim 12, wherein at least part of said humectant is hexylene glycol.

18. The composition of claim 12, wherein at least part of said humectant is a polyoxyethylene glycol.

19. A non-toxic, water-retentive, composition for coating plants having a pH of about 4.5 to 9.5 comprising water, a plant beneficient, a polyhydric alcohol humectant, and an ammonium salt of an addition polymer of an alpha, beta-ethylenically unsaturated carboxylic acid, wherein said addition polymer comprises from about 30 to 86 weight percent of the combined dry weight of humectant and addition polymer, and said alpha, beta-ethylenically unsaturated carboxylic acid comprises from about 5 to 100 mole percent of the monomeric units in said addition polymer.

20. The composition of claim 19, wherein said addition polymer is a copolymer of methacrylic acid and an alkyl acrylate.

21. The composition of claim 19, wherein said addition polymer is a copolymer of acrylic acid and an alkyl acrylate.

22. A non-toxic, water-retentive, composition for coating plants having a pH of about 4.5 to 9.5 comprising water, a polyhydric alcohol humectant, a source of oxygen, and an alkali metal salt of an addition polymer of an alpha, beta-ethylenically unsaturated carboxylic acid, wherein said addition polymer comprises from about 5 to 35 weight percent of the combined dry weight of humectant and addition polymer, and said alpha, beta-ethylenically unsaturated carboxylic acid comprises from about 5 to 100 mole percent of the monomeric units in said addition polymer.

23. Plant material at least partially coated with a partially dry non-sticky, adherent film of a non-toxic, water-retentive coating, comprising a polyhydric alcohol humectant, and a salt of an addition polymer of an alpha, beta-ethylenically unsaturated carboxylic acid, wherein said addition polymer comprises from about 5 to 86 weight percent of the combined dry weight of the humectant and addition polymer, and said ethylenically unsaturated carboxylic acid comprises from about 5 to 100 mole percent of the monomeric units in said addition polymer.

24. The article of claim 23, wherein the cation of said salt is selected from the group consisting of ammonium, potassium and sodium.

25. The article of claim 23, wherein said alpha, beta-ethylenically unsaturated carboxylic acid comprises from 10 to 50 mole percent of the monomeric units in said addition polymer and is an acid selected from the group consisting of acrylic acid, methacrylic acid, maleic anhydride, monoalkyl acid itaconate, monoalkyl acid maleate and monoalkyl acid fumarate.

26. The article of claim 23, wherein said coating composition contains a member selected from the group consisting of a polyvalent metal compound, a fungicide, a source of oxygen, a preservative, a plant nutrient, a plant hormone and mixtures thereof.

27. The article of claim 23, wherein at least part of said humectant is hexylene glycol.

28. The article of claim 23, wherein at least part of said humectant is a polyoxyethylene glycol.

29. Plant material at least partially coated with a partially dry, non-sticky, adherent film of a non-toxic, water-retentive layer comprising a polyhydric alcohol humectant and an ammonium salt of an addition polymer of an alpha, beta-ethylenically unsaturated carboxylic acid, wherein said addition polymer comprises from about 30 to about 86 weight percent of the combined dry weight of humectant and addition polymer, and said alpha, beta-ethylenically unsaturated carboxylic acid comprises from about 5 to 100 mole percent of the monomeric units in said addition polymer.

30. The article of claim 29, wherein said addition polymer is a copolymer of methacrylic acid and an alkyl acrylate.

31. The article of claim 29, wherein said addition polymer is a copolymer of acrylic acid and an alkyl acrylate.

32. Plant material at least partially coated with a partially dry, non-sticky, adherent film of a non-toxic, water-retentive layer comprising a polyhydric alcohol humectant, and an alkali metal salt of an addition polymer of an alpha, beta-ethylenically unsaturated carboxylic acid, wherein said addition polymer comprises from about 5 to 35 weight percent of the combined dry weight of the humectant and addition polymer, and said alpha, beta-ethylenically unsaturated carboxylic acid comprises from about 5 to 100 mole percent of the monomeric units in said addition polymer.

References Cited in the file of this patent

UNITED STATES PATENTS

| | | |
|---|---|---|
| 2,128,973 | Tisdale | Sept. 6, 1938 |
| 2,203,274 | Anderson | June 4, 1940 |
| 2,787,603 | Sanders | Apr. 2, 1957 |
| 2,870,037 | Converse | Jan. 20, 1959 |
| 2,906,724 | Daniel | Sept. 29, 1959 |
| 2,923,692 | Ackerman | Feb. 2, 1960 |
| 2,967,376 | Scott | Jan. 10, 1961 |
| 2,971,292 | Malecki | Feb. 14, 1961 |
| 3,008,817 | Nickell | Nov. 14, 1961 |
| 3,037,881 | McDowell | June 5, 1962 |
| 3,045,394 | Coulter | July 24, 1962 |
| 3,058,940 | Rees | Oct. 16, 1962 |
| 3,089,280 | Klaas | May 14, 1963 |
| 3,118,848 | Lombardi | Jan. 21, 1964 |

OTHER REFERENCES

Condensed Chemical Dictionary, 5th Ed. 1956, pages 135 and 1139.

Condensed Chemical Dictionary, Fifth Edition, N.Y., Reinhold, 1956, page 26 (1956).

Hackh's Chemical Dictionary, Third Edition, Phila., Blakiston, 1944. Page 672 QD5.H3 (1944).